United States Patent
Maheshwari et al.

(10) Patent No.: US 12,429,900 B2
(45) Date of Patent: Sep. 30, 2025

(54) CONTROLLED TRANSITION BETWEEN CONFIGURATION MODE AND USER MODE TO REDUCE CURRENT-RESISTANCE VOLTAGE DROP

(71) Applicant: Intel Corporation, Santa Clara, CA (US)

(72) Inventors: Atul Maheshwari, Portland, OR (US); Ankireddy Nalamalpu, Portland, OR (US); Mahesh A. Iyer, Fremont, CA (US); Mahesh K. Kumashikar, Bangalore (IN)

(73) Assignee: Altera Corporation, San Jose, CA (US)

( * ) Notice: Subject to any disclaimer, the term of this patent is extended or adjusted under 35 U.S.C. 154(b) by 767 days.

(21) Appl. No.: 17/559,411

(22) Filed: Dec. 22, 2021

(65) Prior Publication Data

US 2022/0113756 A1    Apr. 14, 2022

(51) Int. Cl.
*G06F 1/00* (2006.01)
*G06F 1/06* (2006.01)
*G06F 1/08* (2006.01)

(52) U.S. Cl.
CPC . *G06F 1/06* (2013.01); *G06F 1/08* (2013.01)

(58) Field of Classification Search
CPC ................. G06F 1/06; G06F 1/04; G06F 1/08
USPC ......................................................... 713/501
See application file for complete search history.

(56) References Cited

U.S. PATENT DOCUMENTS

| | | | | |
|---|---|---|---|---|
| 6,208,127 B1 * | 3/2001 | Doluca | ................... | G05F 1/575 |
| | | | | 323/349 |
| 6,691,215 B1 * | 2/2004 | Mirov | ................... | G06F 1/3203 |
| | | | | 713/400 |
| 7,812,576 B2 * | 10/2010 | Sutardja | ............. | H02M 1/4225 |
| | | | | 323/284 |
| 8,487,653 B2 * | 7/2013 | Tarng | .................... | H03B 5/366 |
| | | | | 326/38 |
| 11,950,358 B1 * | 4/2024 | Lambrecht | ............... | G06F 1/26 |
| 12,189,344 B2 * | 1/2025 | Whitcombe | ........ | H03M 1/0624 |
| 12,193,698 B2 * | 1/2025 | Shelton, IV | ........ | H01M 50/247 |
| 2004/0120445 A1 * | 6/2004 | Burns | ..................... | G06F 1/305 |
| | | | | 377/27 |
| 2006/0093047 A1 * | 5/2006 | Boerstler | ............. | H03K 23/662 |
| | | | | 375/257 |
| 2008/0183924 A1 * | 7/2008 | Vergnes | .................... | G06F 1/10 |
| | | | | 710/100 |
| 2011/0304139 A1 * | 12/2011 | Hashizume | ............. | B60L 50/15 |
| | | | | 290/7 |
| 2014/0015505 A1 * | 1/2014 | George-Kelso | ........... | G05F 1/46 |
| | | | | 323/285 |

(Continued)

*Primary Examiner* — Volvick Derose
(74) *Attorney, Agent, or Firm* — Fletcher Yoder, P.C.

(57) ABSTRACT

Systems or methods of the present disclosure may provide for gradually adjusting a frequency of a clock signal. When transitioning from a configuration mode to a user mode, a clock of an integrated circuit (e.g., a field-programmable gate array or FPGA) may quickly (e.g., instantaneously) switch from a low configuration mode frequency to a high user mode frequency. This rapid increase in clock frequency may cause an inrush current and corresponding current-resistance voltage (IR) drop. To reduce or avoid the inrush current and IR drop, a frequency of the clock may be gradually ramped up from the configuration mode frequency to the user mode frequency.

20 Claims, 9 Drawing Sheets

(56) References Cited

U.S. PATENT DOCUMENTS

| | | | |
|---|---|---|---|
| 2015/0115864 A1* | 4/2015 | Matsuda | H02P 27/06 |
| | | | 318/808 |
| 2016/0308472 A1* | 10/2016 | Floreancig | H02P 1/30 |
| 2019/0097637 A1* | 3/2019 | Hutton | H03L 7/08 |
| 2022/0113756 A1* | 4/2022 | Maheshwari | G06F 1/06 |

* cited by examiner

CONTROLLED TRANSITION BETWEEN CONFIGURATION MODE AND USER MODE TO REDUCE CURRENT-RESISTANCE VOLTAGE DROP

BACKGROUND

The present disclosure relates generally to integrated circuits, such as those including programmable logic circuitry (e.g., field-programmable gate arrays (FPGA) circuitry). More particularly, the present disclosure relates to reducing current-resistance (IR) drop during a transition between configuring and operating the programmable logic circuitry.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

Integrated circuit devices are found in numerous electronic devices, including computers, handheld devices, automobiles, and more. Some integrated circuits include programmable logic circuitry that can be configured to implement numerous possible systems. The programmable logic circuitry is often referred to as field-programmable gate array (FPGA) circuitry since it can be programmed in the field after manufacturing with such diverse functionality. FPGA circuitry has two operating modes—a configuration mode and a user mode. In the configuration mode, a configuration program (bitstream) for a system design is programmed into the FPGA circuitry in a process referred to as "configuration." Once configured, the FPGA circuitry enters the user mode, where the FPGA circuitry becomes active and implements the system programmed into the FPGA circuitry in the configuration mode (e.g., such that the user system design may operate on data). During transition from the configuration mode to the user mode the FPGA circuitry may experience an inrush current (I), causing a drop in voltage due to resistance (R) (i.e., an IR drop) in the FPGA circuitry. To allow the FPGA circuitry to operate despite the IR drop, the FPGA circuitry or the system design may be designed with guardbands or margins. However, designing the guardbands to accommodate or compensate for the inrush current and/or IR drop may affect FPGA circuitry performance and tighten space constraints, among other undesirable outcomes.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
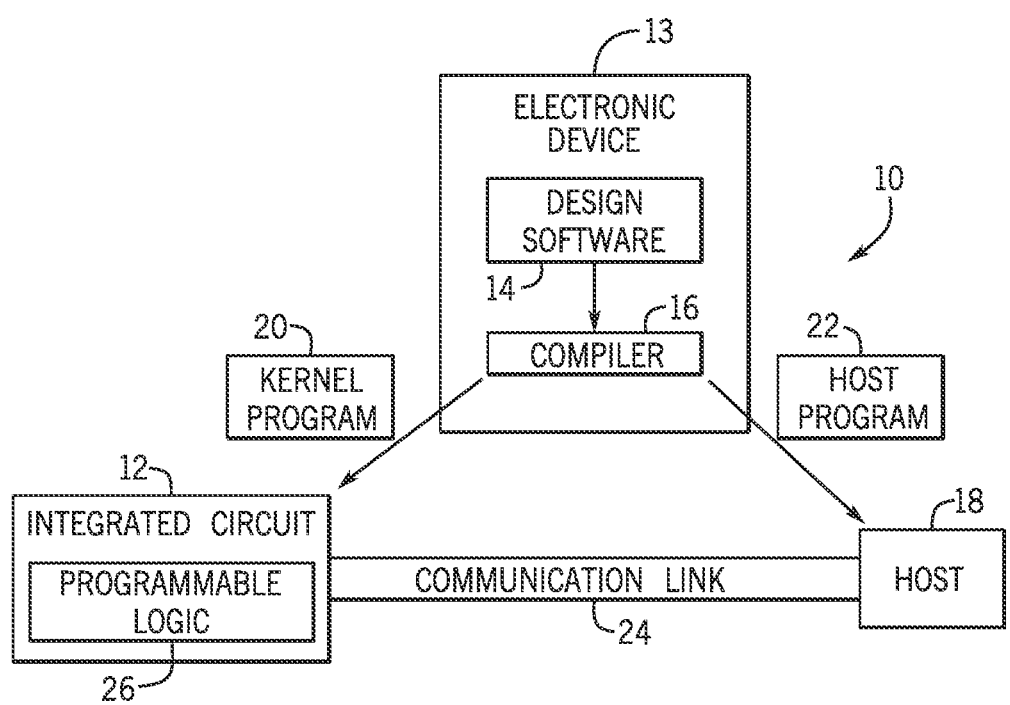
FIG. 1 is a block diagram of a system used to program an integrated circuit, in accordance with an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Programmable logic devices are increasingly permeating markets and are increasingly enabling customers to implement circuit designs in logic fabric (e.g., programmable logic). Certain programmable logic devices, such as those containing field programmable gate array (FPGA) circuitry may use static random-access memory (SRAM) as configuration memory (CRAM), and thus lose their programming when they are powered down and thus are reprogrammed when powered on. A programmable logic device that uses field programmable gate array circuitry may be referred to as an FPGA, though it should be appreciated that other integrated circuits may include such programmable logic circuitry even if not expressly referred to as an FPGA. For ease of discussion, integrated circuits that include programmable logic circuitry will be referred to as an FPGA in the text below. FPGA circuitry has two operating modes—a configuration mode and a user mode. In the configuration mode, a configuration program (bitstream) for a system design is programmed into the FPGA circuitry in a process referred to as "configuration." Once configured, the FPGA circuitry enters the user mode, where the FPGA circuitry becomes active and implements the system that was programmed into the FPGA circuitry during the configuration mode (e.g., such that the user system design may operate on data).

During transition from the configuration mode to the user mode the FPGA may experience a rapid influx of current known as an inrush current. As the inrush current (I) travels through the FPGA circuitry and interacts with the resistive elements (R) of the FPGA, the FPGA may experience a drop in voltage (i.e., an IR drop). An IR drop may be disadvantageous for a number of reasons. The IR drop may cause a significant amount of power to be dissipated as heat, which is not only inefficient but may damage heat sensitive components. Further, running the FPGA may involve using a larger power supply to compensate for the IR drop, which may result in greater design costs and more restrictive space constraints.

The inrush current and IR drop may be accommodated and compensated for using certain design considerations (e.g., margins or guardbands). To maintain operation of the FPGA in safe operating regions, a designer may employ a guardband, i.e., a slack time that may be added to a nominal delay of the FPGA or the system design (e.g., such that the FPGA has a lower operating frequency) to enable the FPGA to tolerate transients such as the inrush current. A guardband that takes into account the worst-case scenario (e.g., takes into account the largest inrush current the FPGA may experience), also known as a pessimistic guardband, may be used to ensure safe operation of the FPGA.

While the pessimistic guardband may be reliable in preventing damage to the FPGA caused by the inrush current, the pessimistic guardband may also limit FPGA performance (e.g., due to increased latency caused by the increased delays of the guardband), resulting in slower configuration times and slower processing and execution speeds. Additionally, the pessimistic guardband does not reduce or avoid the inrush current, it merely prevents the FPGA from being damaged by the inrush current. Therefore, the FPGA may still experience the effects of the inrush current—namely, the corresponding IR drop. Because the FPGA still experiences the IR drop, a larger power supply may be designed for the FPGA to sufficiently compensate for the power lost to IR drop. Thus, while the pessimistic guardband may meet the goal of avoiding damage to the FPGA due to the inrush current, it may also hinder the performance of the FPGA and result in less efficient and more costly design implementations.

The present systems and techniques relate to embodiments for controlling certain aspects of the FPGA as the FPGA transitions from the configuration mode to the user mode such that the IR drop experienced by the FPGA is reduced. In conventional FPGA systems, as the FPGA transitions from the configuration mode to the user mode, the input clock signal of the FPGA may rapidly (e.g., near-instantaneously) increase from an initial frequency to an operating frequency at which the FPGA may implement the system design programmed into the FPGA. The rapid increase in clock frequency may cause the inrush current and resulting IR drop. By smoothing the transition from the initial frequency of the clock signal by gradually ramping it to the ultimate operating frequency, the inrush current, and thus the IR drop, may be reduced.

Ramping the clock frequency to the desired user mode frequency may be accomplished in a number of ways. For example, a state machine may be added to a clock (e.g., a phase-locked loop or PLL). The state machine may enable the PLL to gradually ramp up from the configuration mode frequency to the user mode frequency at which the FPGA may operate by gradually ramping up a PLL feedback divider value.

With the foregoing in mind, FIG. 1 illustrates a block diagram of a system 10 that may be used in configuring an integrated circuit. A designer may desire to implement functionality on an integrated circuit 12 (e.g., a programmable logic device such as a field-programmable gate array (FPGA) or an application-specific integrated circuit (ASIC) that includes programmable logic circuitry). The integrated circuit 12 may include a single integrated circuit, multiple integrated circuits in a package, or multiple integrated circuits in multiple packages communicating remotely (e.g., via wires or traces). In some cases, the designer may specify a high-level program to be implemented, such as an OPENCL® program, which may enable the designer to more efficiently and easily provide programming instructions to configure a set of programmable logic cells for the integrated circuit 12 without specific knowledge of low-level hardware description languages (e.g., Verilog, very high speed integrated circuit hardware description language (VHDL)). For example, since OPENCL® is quite similar to other high-level programming languages, such as C++, designers of programmable logic familiar with such programming languages may have a reduced learning curve than designers that are required to learn unfamiliar low-level hardware description languages to implement new functionalities in the integrated circuit 12.

In a configuration mode of the integrated circuit 12, a designer may use an electronic device 13 (e.g., a computer) to implement high-level designs (e.g., a system user design) using design software 14, such as a version of INTEL® QUARTUS® by INTEL CORPORATION. The electronic device 13 may use the design software 14 and a compiler 16 to convert the high-level program into a lower-level description (e.g., a configuration program, a bitstream). The compiler 16 may provide machine-readable instructions representative of the high-level program to a host 18 and the integrated circuit 12. The host 18 may receive a host program 22, which may be implemented by the kernel programs 20. To implement the host program 22, the host 18 may communicate instructions from the host program 22 to the integrated circuit 12 via a communications link 24, which may be, for example, direct memory access (DMA) communications or peripheral component interconnect express (PCIe) communications. In some embodiments, the kernel programs 20 and the host 18 may enable configuration of programmable logic 26 on the integrated circuit 12. The programmable logic 26 may include circuitry and/or other logic elements and may be configured to implement arithmetic operations, such as addition and multiplication.

The designer may use the design software 14 to generate and/or to specify a low-level program, such as the low-level hardware description languages described above. Further, in some embodiments, the system 10 may be implemented without a separate host program 22. Thus, embodiments described herein are intended to be illustrative and not limiting.

Figure 2:
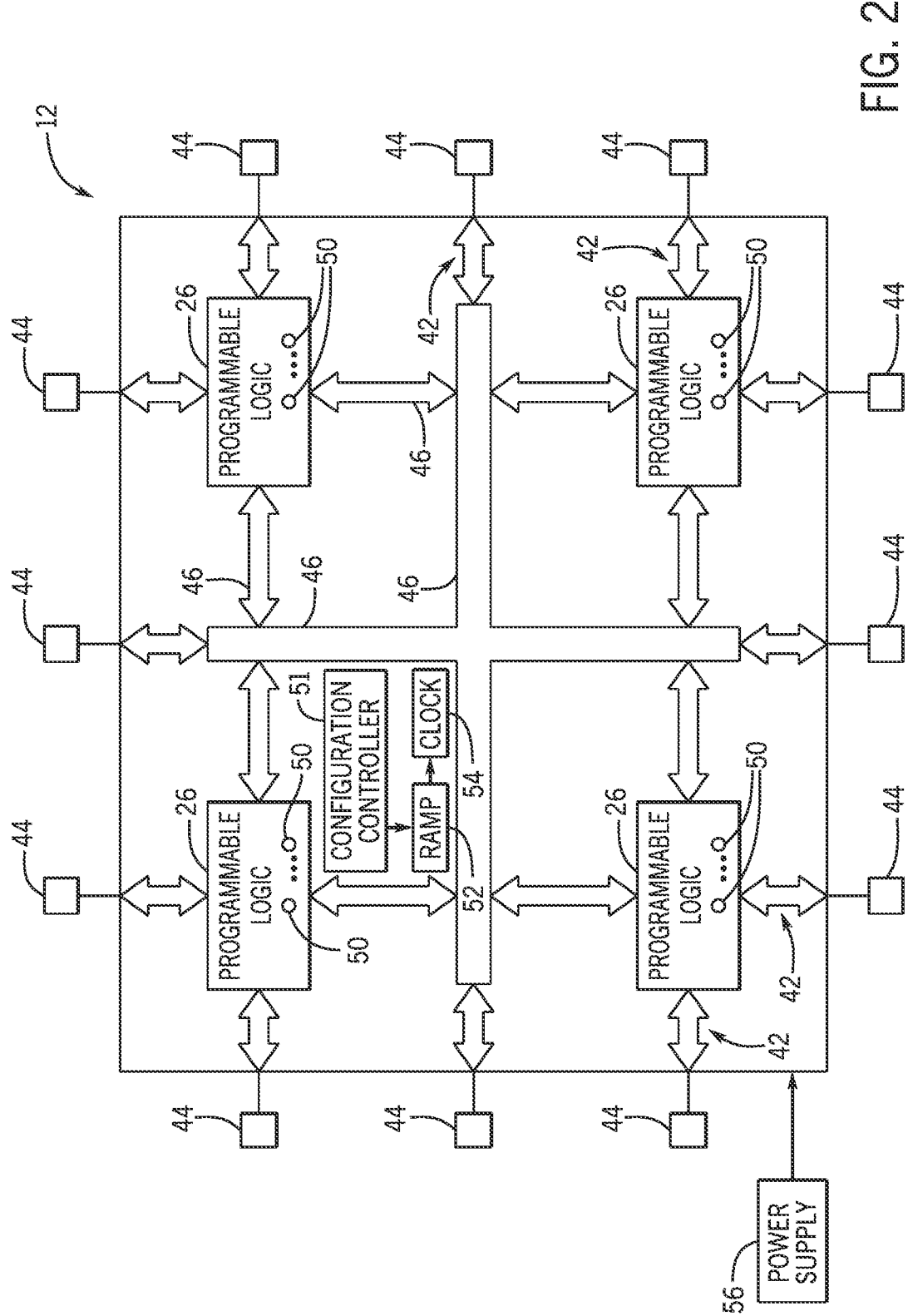
FIG. 2 is a block diagram of an example of the integrated circuit of FIG. 1 as a programmable logic device, in accordance with an embodiment of the present disclosure.

Turning now to a more detailed discussion of the integrated circuit 12, FIG. 2 is a block diagram of an example of the integrated circuit 12 as a programmable logic device, such as a field-programmable gate array (FPGA). Further, it should be understood that the integrated circuit 12 may be any other suitable type of programmable logic device (e.g., an ASIC and/or application-specific standard product). The integrated circuit 12 may be powered by a power supply 56. The power supply 56 may be designed such that it may accommodate or compensate IR drop experienced in the integrated circuit 12 (e.g., due to inrush current). The integrated circuit 12 may have input/output circuitry 42 for driving signals off of the device (e.g., integrated circuit 12) and for receiving signals from other devices via input/output pins 44. Interconnection resources 46, such as global and local vertical and horizontal conductive lines and buses, and/or configuration resources (e.g., hardwired couplings, logical couplings not implemented by user logic), may be used to route signals on integrated circuit 12. Additionally, interconnection resources 46 may include fixed interconnects (conductive lines) and programmable interconnects (i.e., programmable connections between respective fixed interconnects). Programmable logic 26 may include combinational and sequential logic circuitry. For example, programmable logic 26 may include look-up tables, registers, and multiplexers. In various embodiments, the programmable logic 26 may be configured to perform a custom logic function. The programmable interconnects associated with interconnection resources may be considered to be a part of programmable logic 26.

Programmable logic devices, such as the integrated circuit 12, may include programmable elements 50 with the programmable logic 26. For example, as discussed above, a designer (e.g., a customer) may program (e.g., configure) or reprogram (e.g., reconfigure, partially reconfigure) the programmable logic 26 to perform one or more desired functions. By way of example, some programmable logic devices may be programmed or reprogrammed by configuring programmable elements 50 using mask programming arrangements, which is performed during semiconductor manufacturing. Other programmable logic devices are configured after semiconductor fabrication operations have been completed, such as by using electrical programming or laser programming to program programmable elements 50. In general, programmable elements 50 may be based on any suitable programmable technology, such as fuses, antifuses, electrically programmable read-only-memory technology, random-access memory cells, mask-programmed elements, and so forth.

Many programmable logic devices are electrically programmed. With electrical programming arrangements, the programmable elements 50 may be formed from one or more memory cells. For example, during programming (i.e., configuration), configuration data is loaded into the memory cells using input/output pins 44 and input/output circuitry 42. In one embodiment, the memory cells may be implemented as random-access-memory (RAM) cells. The use of memory cells based on RAM technology is described herein is intended to be only one example. Further, since these RAM cells are loaded with configuration data during programming, they are sometimes referred to as configuration RAM cells (CRAM). These memory cells may each provide a corresponding static control output signal that controls the state of an associated logic component in programmable logic 26. For instance, in some embodiments, the output signals may be applied to the gates of metal-oxide-semiconductor (MOS) transistors within the programmable logic 26.

Keeping the discussion of FIG. 1 and FIG. 2 in mind, a user (e.g., designer) may use the design software 14 to configure the programmable logic 26 of the integrated circuit 12 (e.g., with a user system design). In particular, the designer may specify in a high-level program that mathematical operations such as addition and multiplication be performed. The compiler 16 may convert the high-level program into a lower-level description that is used to configure the programmable logic 26 such that the programmable logic 26 may perform a function. For instance, the programmable logic 26 may cause a configuration controller 51 (e.g., control circuitry) to send instructions to adjust a clock 54 (e.g., clock circuitry that may generate a clock signal) via ramp logic 52. Based on an initial frequency and a target frequency, among other parameters, the configuration controller 51 may determine a type and amount of frequency ramp such that inrush current may be reduced or avoided and performance of the integrated circuit 12 may be enhanced or optimized.

As previously discussed, as the configuration program (bitstream) of the design software 14 is compiled via the compiler 16 and loaded into the integrated circuit 12 (e.g., loaded directly or stored in a memory or storage device for loading into the integrated circuit 12 in the future), the integrated circuit 12 may transition from the configuration mode to a user mode. This transition is often characterized by a large inrush current. To prevent the inrush current from damaging the integrated circuit 12, the integrated circuit 12 or the system design may be designed with guardbands. Guardbands may include adjusting timing delays of the integrated circuit 12 to provision for lower voltage and/or current levels so as to avoid damage from transient voltages or currents. For example, if the integrated circuit 12 is designed to handle 0.8 volts (V), the integrated circuit 12 may be guardbanded (e.g., the frequency of the integrated circuit 12 may be reduced) such that it operates at 0.7 V, to ensure a lower transient voltage (e.g., less than a threshold, such as less than a 100 millivolt (mV) transient voltage).

Figure 3:
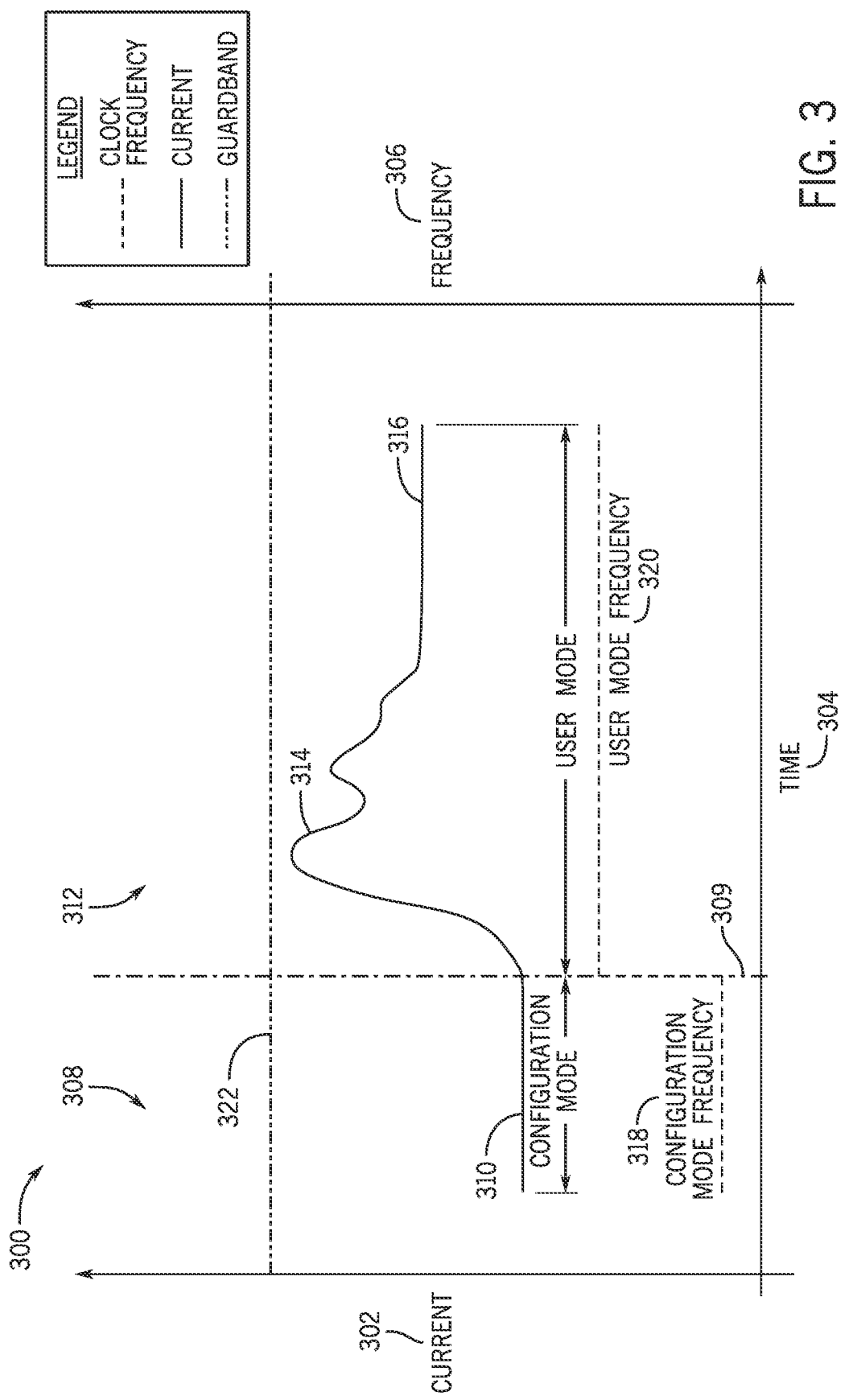
FIG. 3 is a diagram illustrating the operation of the integrated circuit of FIG. 1 as it transitions from the configuration mode to the user mode without using clock frequency ramping, in accordance with an embodiment of the present disclosure.

FIG. 3 is a diagram 300 illustrating the operation of the integrated circuit 12 as it transitions from the configuration mode to the user mode without using clock frequency ramping. The diagram 300 includes a current level 302 of the current driven to the integrated circuit 12 and clock frequency level 306 (e.g., of the clock 54) on the y-axes, and time 304 on the x-axis. As may be observed, when the integrated circuit 12 is in configuration mode 308, the configuration mode current 310 and a configuration mode frequency 318 are in a steady state. Upon transitioning from the configuration mode 308 to a user mode 312 (i.e., at the transition point 309), the clock frequency level 306 of the integrated circuit 12 rises abruptly (e.g., instantaneously) along with an inrush current 314. The inrush current 314 gradually reduces until it settles at the operating current 316.

To prevent the inrush current 314 from exceeding a maximum allowable value, the integrated circuit 12 modeled in the diagram 300 or the system design with which it is programmed is designed with a guardband 322. The guardband represents the maximum amount of current that is allowed to be driven to the integrated circuit 12. However, guardbanding may have certain disadvantages. For instance, lowering the operating frequency of the integrated circuit 12 may negatively impact the operation of the integrated circuit 12 (e.g., by increasing latency). Further, as previously stated, guardbanding does not reduce the inrush current, and thus does not reduce the associated IR drop; thus, a larger power supply 56 may be designed for the integrated circuit 12 to compensate for the IR drop. To address the dual issues of the inrush current 314 and the corresponding IR drop, the clock frequency level 306 may be gradually ramped up from the configuration mode frequency 318 to the user mode frequency 320, as will be discussed further below.

Figure 4:
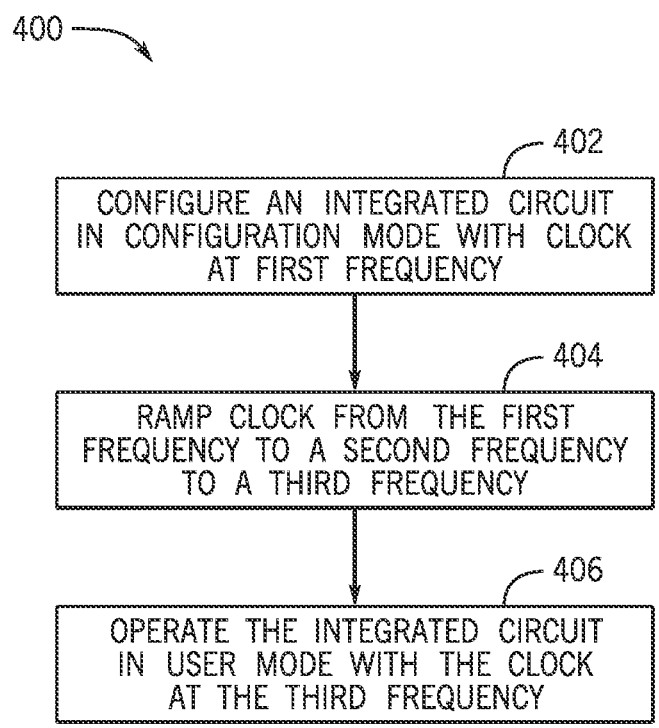
FIG. 4 is a flowchart of a method for gradually ramping the clock frequency of the integrated circuit of FIG. 1 to reduce IR drop, in accordance with an embodiment of the present disclosure.

FIG. 4 is a flowchart of a method 400 for gradually ramping the frequency of the integrated circuit 12. In process block 402, the integrated circuit 12 (e.g., an FPGA) is configured in the configuration mode 308 with the clock 54 (e.g., a phase-locked loop or PLL) of the integrated circuit 12 set to a first frequency (e.g., the configuration mode frequency 318). In process block 404, the clock 54 is ramped up (e.g., by a processor) from the first frequency to a second frequency. The clock 54 is then ramped up from the second frequency to a third frequency (e.g., the operating frequency or the user mode frequency 320). The clock 54 may be ramped up by adjusting a phase-locked loop (PLL) or digitally-locked loop. For example, a state machine may be added to the PLL that gradually ramps up a PLL feedback divider value.

The clock 54 may be ramped up linearly or nonlinearly as may be appropriate given the circumstances. It should be noted that, while the method 400 is described as having three separate frequencies, there may be any appropriate number of intermediate frequencies between the configuration mode frequency 318 and the user mode frequency 320. For instance, the frequency may be ramped up using a stepwise function, where ramping may include any appropriate number of steps between the configuration mode frequency 318 and the user mode frequency 320 (e.g., one step, five steps, ten steps, fifty steps, and so on). In process block 406, the integrated circuit 12 is operated in the user mode 312 with the clock 54 operating at the third frequency (e.g., the user mode frequency 320).

Figure 5:
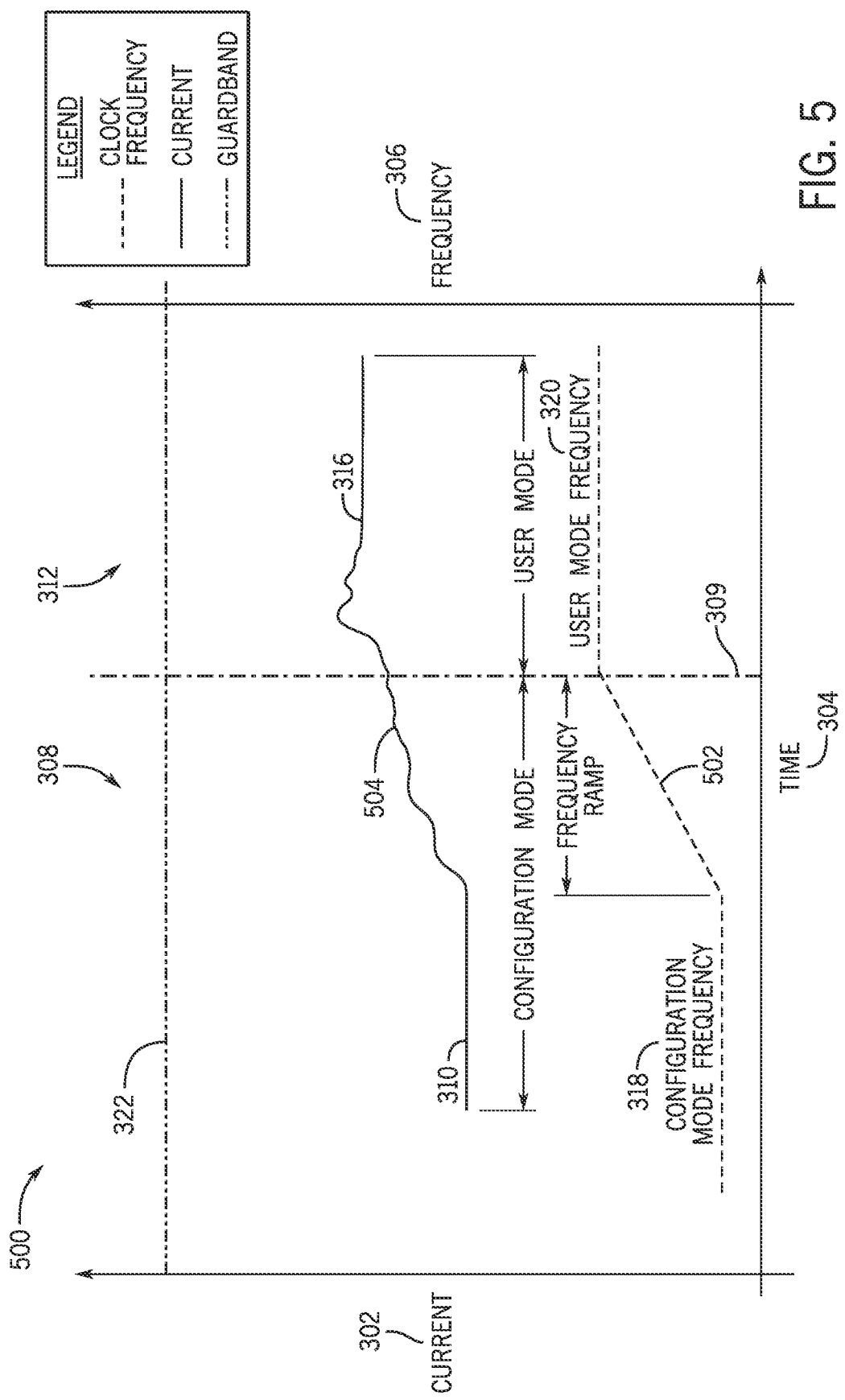
FIG. 5 is a diagram illustrating the operation of the integrated circuit of FIG. 1 using the clock frequency ramping method of FIG. 4 to linearly ramp the clock frequency, in accordance with an embodiment of the present disclosure.

FIG. 5 is a diagram 500 illustrating the operation of the integrated circuit 12 as the clock 54 frequency is ramped up linearly as the integrated circuit 12 transitions from the configuration mode 308 to the user mode 312. The linear ramp 502 is a linear increase from the configuration mode frequency 318 to the user mode frequency 320. As may be observed, the linear ramp 502 begins in the configuration mode and levels off at the user mode frequency 320 at the transition point 309. In certain embodiments, the clock frequency may ramp up in parallel with configuration of the integrated circuit 12 to reduce or avoid an increase in the latency of the integrated circuit 12.

Gradually ramping the clock frequency may significantly reduce the inrush current 314, resulting in a reduced inrush current 504. Because of the reduced inrush current 504, a designer may choose to lower the guardband 322, as the worst case scenario for the transient current experienced by the integrated circuit 12 has been reduced. By reducing the guardband 322, the designer may decrease the delays added to the integrated circuit 12, enabling the integrated circuit 12 to operate at a greater clock frequency. Further, the reduced inrush current 504 may lead to a reduced IR drop. Accordingly, a smaller power supply 56 may be used to compensate for the reduced IR drop.

Figure 6:
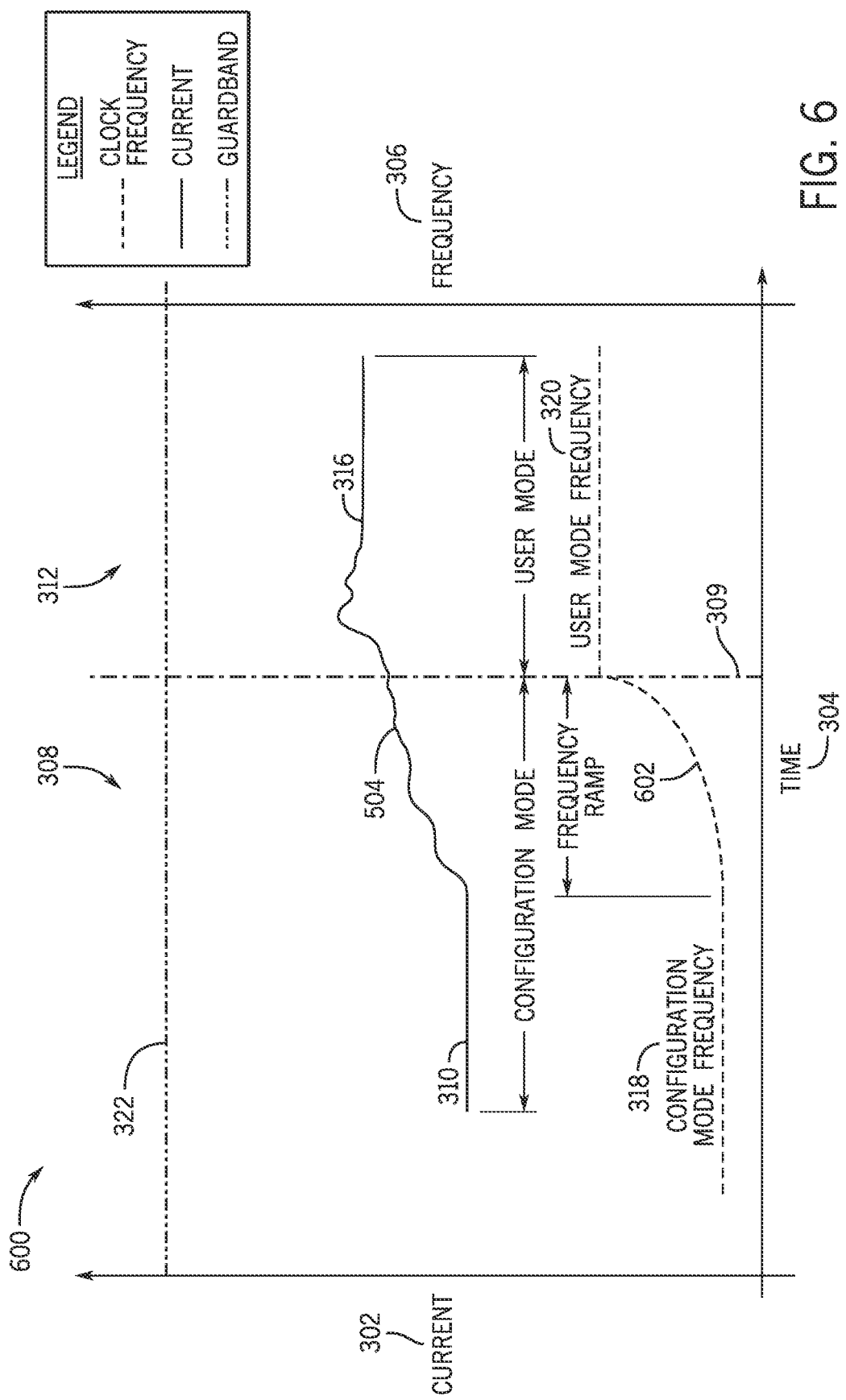
FIG. 6 is a diagram illustrating the operation of the integrated circuit of FIG. 1 using the clock frequency ramping method of FIG. 4 to nonlinearly ramp the clock frequency, in accordance with an embodiment of the present disclosure.

FIG. 6 is a diagram 600 illustrating the operation of the integrated circuit 12 as the clock 54 frequency is ramped up nonlinearly as the integrated circuit 12 transitions from the configuration mode 308 to the user mode 312. In certain embodiments (e.g., for certain configurations of the integrated circuit 12) it may be advantageous to ramp the clock frequency nonlinearly (e.g., as may be seen from the nonlinear ramp 602). For example, it may be advantageous to slowly ramp the clock frequency towards the beginning of the configuration mode and increase the ramp closer to the transition point 309. Alternatively, certain embodiment may benefit from quickly increasing the clock frequency ramp at the beginning of the configuration mode 308 and gradually taper the ramp as the transition point 309 nears.

Figure 7:
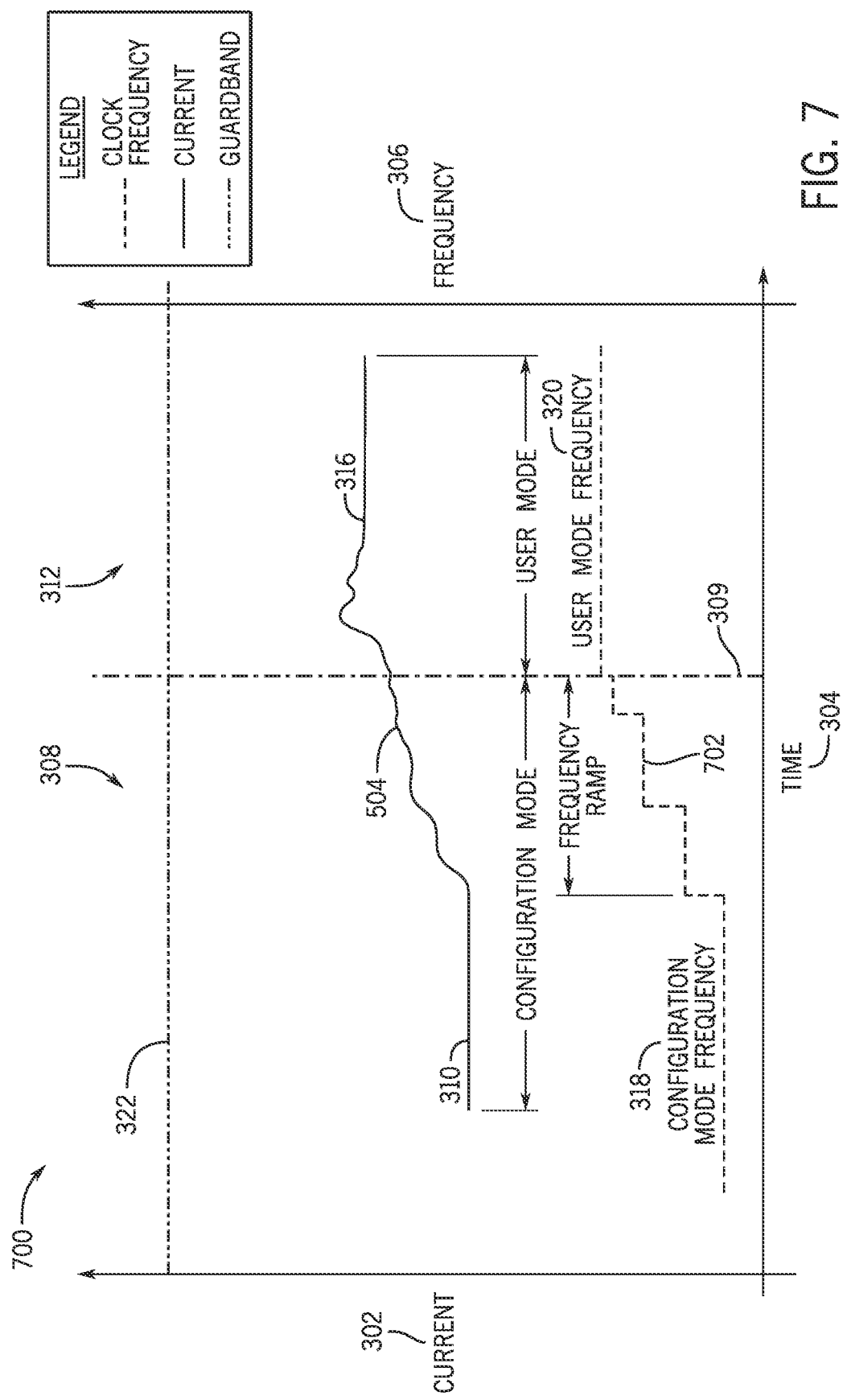
FIG. 7 is a diagram illustrating the operation of the integrated circuit of FIG. 1 using the clock frequency ramping method of FIG. 4 to ramp the clock frequency using a stepwise function, in accordance with an embodiment of the present disclosure.

FIG. 7 is a diagram 700 illustrating the operation of the integrated circuit 12 as the clock 54 frequency is ramped up using a stepwise ramping function as the integrated circuit 12 transitions from the configuration mode 308 to the user mode 312. In some embodiments it may be beneficial to use a stepwise ramp 702. For example, it may be advantageous for the clock 54 to be configured and reconfigured (e.g., via the configuration controller 51) in longer, slower increments rather than to be constantly configured and reconfigured in minute increments (e.g., as may be the case in the linear ramp 502).

Figure 8:
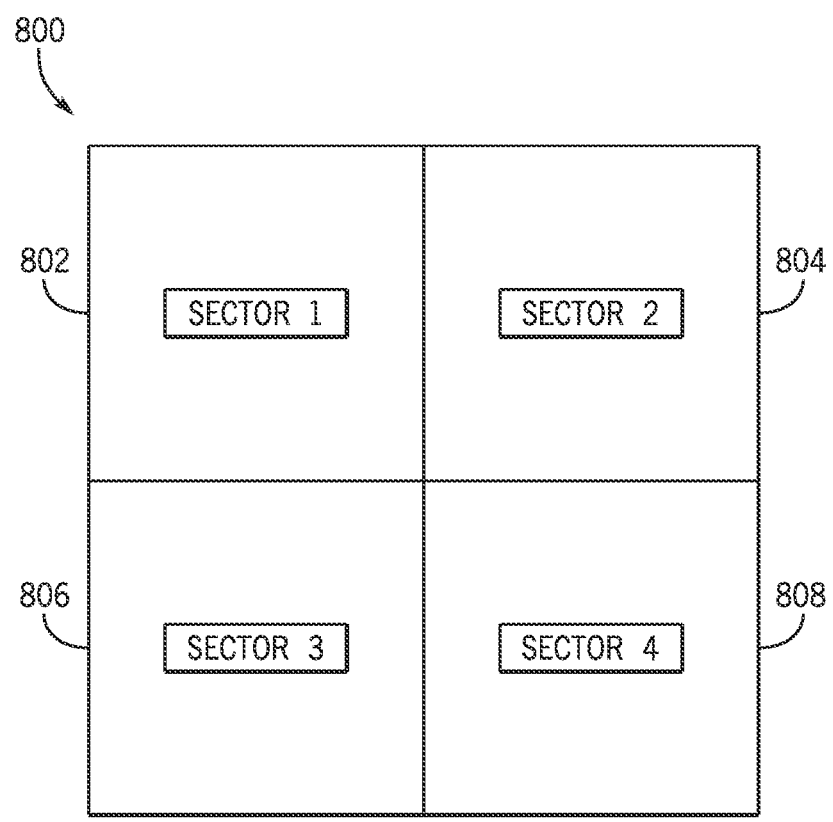
FIG. 8 is a diagram illustrating sectors of the integrated circuit of FIG. 1, in accordance with an embodiment of the present disclosure.

FIG. 8 is a diagram 800 illustrating sectors of the integrated circuit 12. The integrated circuit 12 (e.g., an FPGA) may have a first sector 802, a second sector 804, a third sector 806, and a fourth sector 808. Each sector may have its own programmable logic (e.g., 26) and each sector may be configured with a unique configuration. Additionally, each sector may have its own clock 54, and the clock frequency of each clock may be ramped according to the user system design. For example, a clock in the first sector 802 may be configured to have a linear ramp (e.g., 502), a clock in the second sector 804 and a clock in the third sector 806 may be configured to have a nonlinear ramp (e.g., 602), while a clock in fourth sector 808 may be configured to ramp up according to a stepwise function (e.g., 702). In another embodiment, each sector may represent a separate integrated circuit, and each integrated circuit may have its own programmable logic that may be configured as described above.

Figure 9:
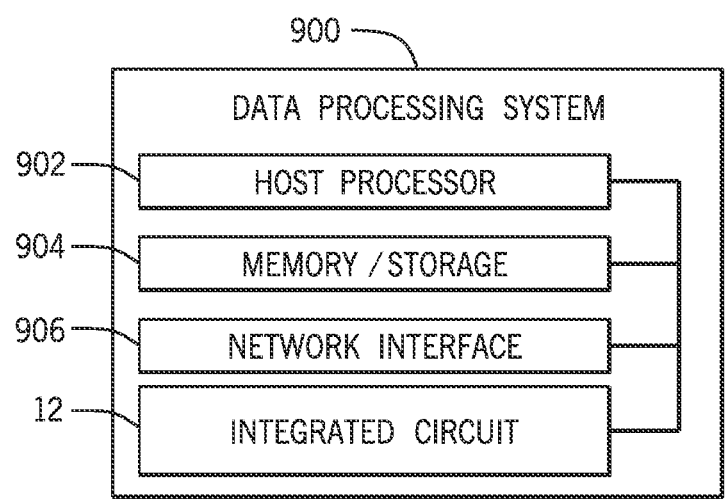
FIG. 9 is a block diagram of a data processing system that may use a programmable logic device to rapidly respond to data processing requests, in accordance with an embodiment of the present disclosure.

With the foregoing in mind, the integrated circuit 12 may be a data processing system or may be a component of a data processing system that may benefit from application of one of the many clock frequency ramping techniques described herein. For example, the integrated circuit 12 may be a component of a data processing system 900, shown in FIG. 9. The data processing system 900 includes a host processor 902, memory and/or storage circuitry 904, and a network interface 906. The data processing system 900 may include more or fewer components (e.g., electronic display, user interface structures, application specific integrated circuits (ASICs)). The host processor 902 may include any suitable processor, such as an Intel® Xeon® processor or a reduced-instruction processor (e.g., a reduced instruction set computer (RISC), an Advanced RISC Machine (ARM) processor) that may manage a data processing request for the data processing system 900 (e.g., to perform machine learning, video processing, voice recognition, image recognition, data compression, database search ranking, bioinformatics, network security pattern identification, spatial navigation, or the like). The memory and/or storage circuitry 904 may include random access memory (RAM), read-only memory (ROM), one or more hard drives, flash memory, or the like. The memory and/or storage circuitry 904 may be considered external memory to the integrated circuit 12 and may hold data to be processed by the data processing system 900. In some cases, the memory and/or storage circuitry 904 may also store configuration programs (e.g., bitstreams) for programming the integrated circuit 12. The network interface 906 may permit the data processing system 900 to communicate with other electronic devices. The data processing system 900 may include several different packages or may be contained within a single package on a single package substrate.

In one example, the data processing system 900 may be part of a data center that processes a variety of different requests. For instance, the data processing system 900 may receive a data processing request via the network interface 906 to perform machine learning, video processing, voice recognition, image recognition, data compression, database search ranking, bioinformatics, network security pattern identification, spatial navigation, or some other specialized task. The host processor 902 may cause the programmable logic fabric of the integrated circuit 12 to be programmed with a particular accelerator related to requested task. For instance, the host processor 902 may instruct that configuration data (bitstream) stored on the memory/storage circuitry 904 or cached in sector-aligned memory of the integrated circuit 12 to be programmed into the programmable logic fabric (e.g., programmable logic 26) of the integrated circuit 12. The configuration data (bitstream) may represent a circuit design for a particular accelerator function relevant to the requested task. Due to the high density of the programmable logic fabric, the proximity of the substantial amount of sector-aligned memory to the programmable logic fabric, or other features of the integrated circuit 12 that are described here, the integrated circuit 12 may rapidly assist the data processing system 900 in performing the requested task. Moreover, by using a reduced guardband made possible by the reduction in IR drop before operating in user mode, the integrated circuit 12 may consume less power, allowing the data processing system 900 to consume less power overall.

The methods and devices of this disclosure may be incorporated into any suitable circuit. For example, the methods and devices may be incorporated into numerous types of devices such as microprocessors or other integrated circuits. Exemplary integrated circuits include programmable array logic (PAL), programmable logic arrays (PLAs), field programmable logic arrays (FPLAs), electrically programmable logic devices (EPLDs), electrically erasable programmable logic devices (EEPLDs), logic cell arrays (LCAs), field programmable gate arrays (FPGAs), application specific standard products (ASSPs), application specific integrated circuits (ASICs), and microprocessors, just to name a few.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

Example Embodiment 1

An integrated circuit system comprising:
programmable logic circuitry to be configured with a user system design during a first mode using a clock signal having a first frequency and to run the user system design in a second mode using the clock signal having a second frequency;
clock circuitry that generates the clock signal; and
control circuitry that directs the clock circuitry to change from the first frequency to the second frequency over a period of time to reduce a maximum inrush current when transitioning from the first mode to the second mode.

Example Embodiment 2

The integrated circuit system of example embodiment 1, wherein the control circuitry directs the clock circuitry to ramp from the first frequency to the second frequency over the period of time.

Example Embodiment 3

The integrated circuit system of example embodiment 2, wherein the control circuitry directs the clock circuitry to ramp linearly from the first frequency to the second frequency over the period of time.

Example Embodiment 4

The integrated circuit system of example embodiment 1, wherein the control circuitry directs the clock circuitry to change from the first frequency to an intermediate frequency before changing to the second frequency, wherein the intermediate frequency is higher than the first frequency and lower than the second frequency.

Example Embodiment 5

The integrated circuit system of example embodiment 1, wherein the clock circuitry comprises a phase-locked loop.

Example Embodiment 6

The integrated circuit system of example embodiment 5, wherein the control circuitry directs the phase-locked loop to change from the first frequency to the second frequency by gradually increasing a feedback divider value of the phase-locked loop.

Example Embodiment 7

The integrated circuit system of example embodiment 1, wherein the first mode comprises a configuration mode and the second mode comprises a user mode.

Example Embodiment 8

The integrated circuit system of example embodiment 1, wherein the control circuitry comprises a state machine.

Example Embodiment 9

The integrated circuit system of example embodiment 1, wherein the control circuitry comprises a processor executing instructions.

Example Embodiment 10

The integrated circuit system of example embodiment 1, wherein the control circuitry and the programmable logic circuitry are disposed on the same circuit.

Example Embodiment 11

The integrated circuit system of example embodiment 1, wherein the clock circuitry is external to the programmable logic circuitry.

Example Embodiment 12

The integrated circuit system of example embodiment 1, wherein the control circuitry initiates the frequency ramping before entering the second mode.

Example Embodiment 13

A method, comprising:
configuring programmable logic circuitry of an integrated circuit in a configuration mode using a clock at a first frequency;
increasing the clock from the first frequency to a second frequency over a first period and increasing the clock from the second frequency to a third frequency over a second period to reduce an influx of current; and
operating the programmable logic circuitry in a user mode at the third frequency.

Example Embodiment 14

The method of example embodiment 13, wherein the clock is increased substantially linearly from the first frequency to the second frequency over the first period or from the second frequency to the third frequency over the second period.

Example Embodiment 15

The method of example embodiment 13, wherein the clock is increased in a piecewise manner from the first frequency to the second frequency or from the second frequency to the third frequency.

Example Embodiment 16

The method of example embodiment 13, wherein the clock is increased according to a nonlinear function from the first frequency to the second frequency or from the second frequency to the third frequency.

Example Embodiment 17

The method of example embodiment 13, comprising supplying power to the integrated circuit using a lower guardband than required were the clock increased directly from the first frequency to the third frequency.

Example Embodiment 18

A tangible, non-transitory, computer-readable medium, comprising computer-readable instructions that, when executed by one or more processors of an electronic device, cause the electronic device to:
receive a system design for an integrated circuit; and
direct the integrated circuit to:
configure programmable logic circuitry of the integrated circuit with the system design in a first mode at a first frequency;
ramp the first frequency to a second frequency over a period of time; and
operate the system design in a second mode at the second frequency.

Example Embodiment 19

The tangible, non-transitory, computer-readable medium of example embodiment 18, wherein the first mode is a configuration mode and the second mode is a user mode.

Example Embodiment 20

The tangible, non-transitory, computer-readable medium of example embodiment 18, wherein the period of time begins in the first mode and ends upon the integrated circuit operating the system design in the second mode.

What is claimed is:

1. An integrated circuit system comprising:
programmable logic circuitry to be configured with a user system design during a configuration mode using a clock signal having a first frequency and to run the user system design in a user mode using the clock signal having a second frequency;
clock circuitry that generates the clock signal; and
control circuitry that directs the clock circuitry to change from the first frequency to the second frequency over a period of time to reduce a maximum inrush current when transitioning from the configuration mode to the user mode.

2. The integrated circuit system of claim 1, wherein the control circuitry directs the clock circuitry to ramp from the first frequency to the second frequency over the period of time.

3. The integrated circuit system of claim 2, wherein the control circuitry directs the clock circuitry to ramp linearly from the first frequency to the second frequency over the period of time.

4. The integrated circuit system of claim 1, wherein the control circuitry directs the clock circuitry to change from the first frequency to an intermediate frequency before changing to the second frequency, wherein the intermediate frequency is higher than the first frequency and lower than the second frequency.

5. The integrated circuit system of claim 1, wherein the clock circuitry comprises a phase-locked loop.

6. The integrated circuit system of claim 5, wherein the control circuitry directs the phase-locked loop to change from the first frequency to the second frequency by gradually increasing a feedback divider value of the phase-locked loop.

7. The integrated circuit system of claim 1, wherein the control circuitry comprises a state machine.

8. The integrated circuit system of claim 1, wherein the control circuitry comprises a processor executing instructions.

9. The integrated circuit system of claim 1, wherein the control circuitry and the programmable logic circuitry are disposed on the same circuit.

10. The integrated circuit system of claim 1, wherein the clock circuitry is external to the programmable logic circuitry.

11. The integrated circuit system of claim 1, wherein the control circuitry initiates the frequency ramping before entering the user mode.

12. The integrated circuit system of claim 1, wherein the programmable logic circuitry comprises a plurality of sectors and the clock circuitry comprises a plurality of clocks, wherein each of the plurality of sectors comprises a clock of the plurality of clocks.

13. The integrated circuit system of claim 1, wherein the programmable logic circuitry receives a bitstream corresponding to the user system design.

14. A method, comprising:
configuring programmable logic circuitry of an integrated circuit in a configuration mode using a clock at a first frequency;
increasing the clock from the first frequency to a second frequency over a first period and increasing the clock from the second frequency to a third frequency over a second period to reduce an influx of current; and
operating the programmable logic circuitry in a user mode at the third frequency.

15. The method of claim 14, wherein the clock is increased substantially linearly from the first frequency to the second frequency over the first period or from the second frequency to the third frequency over the second period.

16. The method of claim 14, wherein the clock is increased in a piecewise manner from the first frequency to the second frequency or from the second frequency to the third frequency.

17. The method of claim 14, wherein the clock is increased according to a nonlinear function from the first frequency to the second frequency or from the second frequency to the third frequency.

18. The method of claim 14, comprising supplying power to the integrated circuit using a lower guardband than required, wherein the clock increased directly from the first frequency to the third frequency.

19. A tangible, non-transitory, computer-readable medium, comprising computer-readable instructions that, when executed by one or more processors of an electronic device, cause the electronic device to:
receive a system design for an integrated circuit; and
direct the integrated circuit to:
configure programmable logic circuitry of the integrated circuit with the system design in a configuration mode at a first frequency;
ramp the first frequency to a second frequency over a period of time; and
operate the system design in a user mode at the second frequency.

20. The tangible, non-transitory, computer-readable medium of claim 19, wherein the period of time begins in the configuration mode and ends upon the integrated circuit operating the system design in the user mode.

* * * * *